United States Patent
Zhu et al.

(10) Patent No.: US 8,416,723 B2
(45) Date of Patent: Apr. 9, 2013

(54) METHOD, SYSTEM, AND DEVICE FOR ESTABLISHING ASSOCIATION-CONTROL RELATIONS

(75) Inventors: Dongming Zhu, Shenzhen (CN); Songhai Ye, Shenzhen (CN); Chunyan Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 491 days.

(21) Appl. No.: 12/612,513

(22) Filed: Nov. 4, 2009

(65) Prior Publication Data
US 2010/0046407 A1    Feb. 25, 2010

Related U.S. Application Data

(63) Continuation of application No. PCT/CN2008/072470, filed on Sep. 23, 2008.

(30) Foreign Application Priority Data

Sep. 30, 2007   (CN) .......................... 2007 1 0149989

(51) Int. Cl.
*H04B 7/00*   (2006.01)
(52) U.S. Cl.
USPC .................... 370/310.2; 370/352; 370/392
(58) Field of Classification Search .................. 370/310, 370/310.2, 352, 392
See application file for complete search history.

(56) References Cited

U.S. PATENT DOCUMENTS

| | | |
|---|---|---|
| 2004/0190498 A1 | 9/2004 | Kallio et al. |
| 2004/0198357 A1* | 10/2004 | Plyle et al. ................. 455/435.3 |
| 2006/0218291 A1 | 9/2006 | Zhu et al. |
| 2010/0118861 A1* | 5/2010 | Witzel et al. .................. 370/352 |
| 2010/0157985 A1* | 6/2010 | Nakada et al. ................ 370/352 |

FOREIGN PATENT DOCUMENTS

| | | |
|---|---|---|
| CN | 1773967 A | 5/2006 |
| CN | 1842084 A | 10/2006 |
| CN | 1988714 A | 6/2007 |

OTHER PUBLICATIONS

3GPP TR 23.892 V1.0.0 (Jun. 2007).*
ETSI TS 123 228 V7.6.0 (Dec. 2006).*
"Digital Cellular Telecommunications System (Phase 2+); Universal Mobile Telecommunications System (UMTS); IP Multimedia Subsystem (IMS); Stage 2 (3GPP TS 23.228 version 7.6.0 Release 7)." 3GPP. Dec. 2006.

(Continued)

*Primary Examiner* — Sai-Ming Chan
(74) *Attorney, Agent, or Firm* — Brinks Hofer Gilson & Lione

(57) ABSTRACT

A method for establishing association-control relations includes these steps: An access adapting unit acquires subscription information of the user through a mobile application part (MAP) message, an SH interface message, or a Cx interface message; and acquires information indicating that the user is an ICS user from the subscription information of the user. A system, an access adapting unit, and an IMS CS control function (ICCF) for establishing association-control relations are also provided. In embodiments of the present invention, an access adapting unit such as a local-CS access adaptation function-network (L-CAAF-n) may know whether a user is an IMS centralized service (ICS) user and acquire the ICCF address information so that association-control relations may be established between the L-CAAF-n and the ICCF.

12 Claims, 10 Drawing Sheets

OTHER PUBLICATIONS

"3$^{rd}$ Generation Partnership Project; Technical Specification Group Services and System Aspects; IP Multimedia System (IMS) Centralized Services (Release 8)." Clean Version. 3GPP. Jul. 7, 2007.

"3$^{rd}$ Generation Partnership Project; Technical Specification Group Services and System Aspects; IP Multimedia System (IMS) Centralized Services (Release 8)." Redlined Version. 3GPP. Jul. 7, 2007.

"3$^{rd}$ Generation Partnership Project; Technical Specification Group Services and System Aspects; IP Multimedia System (IMS) Centralized Services (Release 8)." Redlined Version. 3GPP. Sep. 2007.

Supplementary Search Report issued in corresponding European Patent Application No. 08 80 0959; Apr. 21, 2010.

Office Action issued in corresponding Chinese Patent Application No. 200710149989.2; issued Aug. 4, 2010.

Office Action issued in corresponding Russian Patent Application No. 2010117166, mailed Mar. 14, 2011.

Extended European Search Report issued in corresponding European Patent Application No. 11167625.0, mailed Sep. 2, 2011.

\* cited by examiner

METHOD, SYSTEM, AND DEVICE FOR ESTABLISHING ASSOCIATION-CONTROL RELATIONS

CROSS-REFERENCE TO RELATED APPLICATIONS

This application is a continuation of International Application No. PCT/CN2008/072470, filed on Sep. 23, 2008, which claims priority to Chinese Patent Application No. 200710149989.2, filed on Sep. 30, 2007, both of which are hereby incorporated by reference in their entireties.

FIELD OF THE INVENTION

The present invention relates to communication technologies, and in particular, to a method, system, and device for establishing association-control relations.

BACKGROUND OF THE INVENTION

An IP multimedia subsystem (IMS) is defined for a wideband code division multiple access (WCDMA) network by the Third Generation Partnership Project (3GPP) in the R5/R6 standard. The IMS implements packet voice and data services in third generation (3G) mobile networks and provides unified multimedia services and applications. The IMS uses an IP packet domain as its bearer channel for control signaling and media transmission and uses the Session Initiation Protocol (SIP) for exchanging call control signaling. In the IMS, the user subscription data is centralized on a home subscriber server (HSS) for management. Services are uniformly provided by an application server (AS) and session control is completed by a call session control function (CSCF). In the network structure, the service provision is completely separated from the session control. A serving CSCF (S-CSCF) triggers services to the AS for processing. Multiple ASs may process services together. A user accesses the IMS through its current proxy CSCF (P-CSCF) and sessions and services are controlled by the serving node in the home domain of the place where the user is registered. Thus, the user may enjoy the same services at different access points. This separates service management, session control, and bearer access from each other, and provides services independent of access and location.

The IMS is defined in 3GPP and Telecommunications and Internet Converged Services and Protocols for Advanced Networking (TISPAN) standards. In 3GPP2 standards, a multimedia domain (MMD) similar to a multimedia subsystem is defined. The structure of the MMD is similar to the structure of the IMS. To simplify descriptions, the following describes only the IMS, but apparently, the methods hereunder are also applicable to the MMD.

In the evolution to IMS networks, circuit switched (CS) networks and IMS networks may coexist for a period of time. In this case, operators want to have a control point to control the services in the CS and IMS domains in a centralized way so as to decrease the deployment and management cost and to provide a consistent service experience. The control point is usually deployed in the IMS network and is implemented by the AS. That is, when a user accesses through a CS network, the IMS network also provides services for the user.

This issue also exists in an IMS centralized service (ICS) in 3GPP and TISPAN standards. FIG. 1 shows the structure of the ICS. As a new function, the local-CS access adaptation function-network (L-CAAF-n) may be independently deployed between a user equipment (UE) and a mobile switching center (MSC) or be integrated with the MSC. The L-CAAF-n is mainly adapted to identify whether a user is an ICS user. If the user is an ICS user, the L-CAAF-n performs mutual transformation on CS signaling and SIP signaling of the user and sends the transformed signaling to an IMS CS control function (ICCF). The L-CAAF-n may be regarded as an access adapting unit that transforms CS signaling into SIP signaling. The ICCF is an AS with the user agent (UA) function, and accesses the IMS domain as an agent of a UE in the IMS domain. When an ICS user accesses through the CS domain, the L-CAAF-n needs to send the transformed SIP signaling to the ICCF and the ICCF accesses the IMS domain as an agent of the user. The ICCF controls the access of the user to the IMS domain through the CS domain.

During the implementation of the present invention, the inventor discovers at least the following problems in the prior art:

Different ICS users may have different ICCFs. When an ICS user is routed to an L-CAAF-n for the first time, the L-CAAF-n does not have the ICCF address information of the user and fails to send the transformed SIP signaling to the ICCF. Thus, it is urgent to enable the L-CAAF-n to acquire the address information of the ICCF and determine whether a user is an ICS user.

SUMMARY OF THE INVENTION

Embodiments of the present invention provide a method, system, and device for establishing association-control relations so that an access adapting unit such as an L-CAAF-n may establish association-control relations with an ICCF for ICS users.

A method for determining whether a user is an ICS user in an embodiment of the present invention includes:
  acquiring, by an access adapting unit, subscription information of the user through a mobile application part (MAP) message, an SH interface message, or a Cx interface message; and
  acquiring information indicating that the user is an ICS user from the subscription information of the user.

A system for establishing association-control relations in an embodiment of the present invention includes an access adapting unit and an ICCF, where:
  the access adapting unit is adapted to: acquire ICCF address information after determining that a user is an ICS user and notify CS information of the user to the ICCF, where the CS information includes address information of the access adapting unit; and
  the ICCF is adapted to: acquire the address information of the access adapting unit and provide its own address information for the access adapting unit.

An access adapting unit in an embodiment of the present invention includes:
  an ICS user judging subunit, adapted to determine whether a user is an ICS user;
  an ICCF address acquiring subunit, in communication with the ICS user judging subunit and adapted to acquire ICCF address information after determining that a user is an ICS user; and
  a CS information sending subunit, in communication with the ICCF address acquiring subunit and adapted to notify CS information of the user to the ICCF.

An ICCF in an embodiment of the present invention includes:
  an access adapting unit address acquiring subunit, adapted to acquire address information of an access adapting unit; and an ICCF address providing subunit, adapted to provide its own address information for the access adapting unit address acquiring subunit.

In the embodiments of the present invention, the access adapting unit such as an L-CAAF-n may know whether a user is an ICS user according to the subscription information of the user, which is different from the prior art. When the user is an ICS user, the access adapting unit may acquire the ICCF address information and send its own address information to the ICCF. In this way, the L-CAAF-n and the ICCF may know the address information of each other and association-control relations may be established between the L-CAAF-n and the ICCF.

BRIEF DESCRIPTION OF THE DRAWINGS

For better understanding of the technical solution provided in the embodiments of the present invention or in the prior art, the following describes the accompanying drawings that are used in the embodiments of the present invention or in the prior art. Obviously, the following drawings are some exemplary embodiments of the present invention only. Those skilled in the art may obtain other drawings based on the following drawings without creative work.

DETAILED DESCRIPTION OF THE INVENTION

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain based on the embodiments of the present invention also fall in the scope of protection of the present invention.

In the embodiments of the present invention, establishing association-control relations means that an access adapting unit and an ICCF know the address information of each other. CS registration includes location update when the UE is power-on and attached on the network and when the UE moves from an MSC/VLR to another.

In the following embodiment, suppose that a UE fails to be attached to the CS network at the beginning and then normal CS attach and location update are performed. When the UE performs location update, an extended mobile application part (MAP) message such as a MAP_UPDATE_LOCATION message may be used to identify that the visited network supports the L-CAAF-n. In this way, the home location register (HLR) may know that the visited network supports the L-CAAF-n and identify that the user is an ICS user when delivering data.

Figure 1:
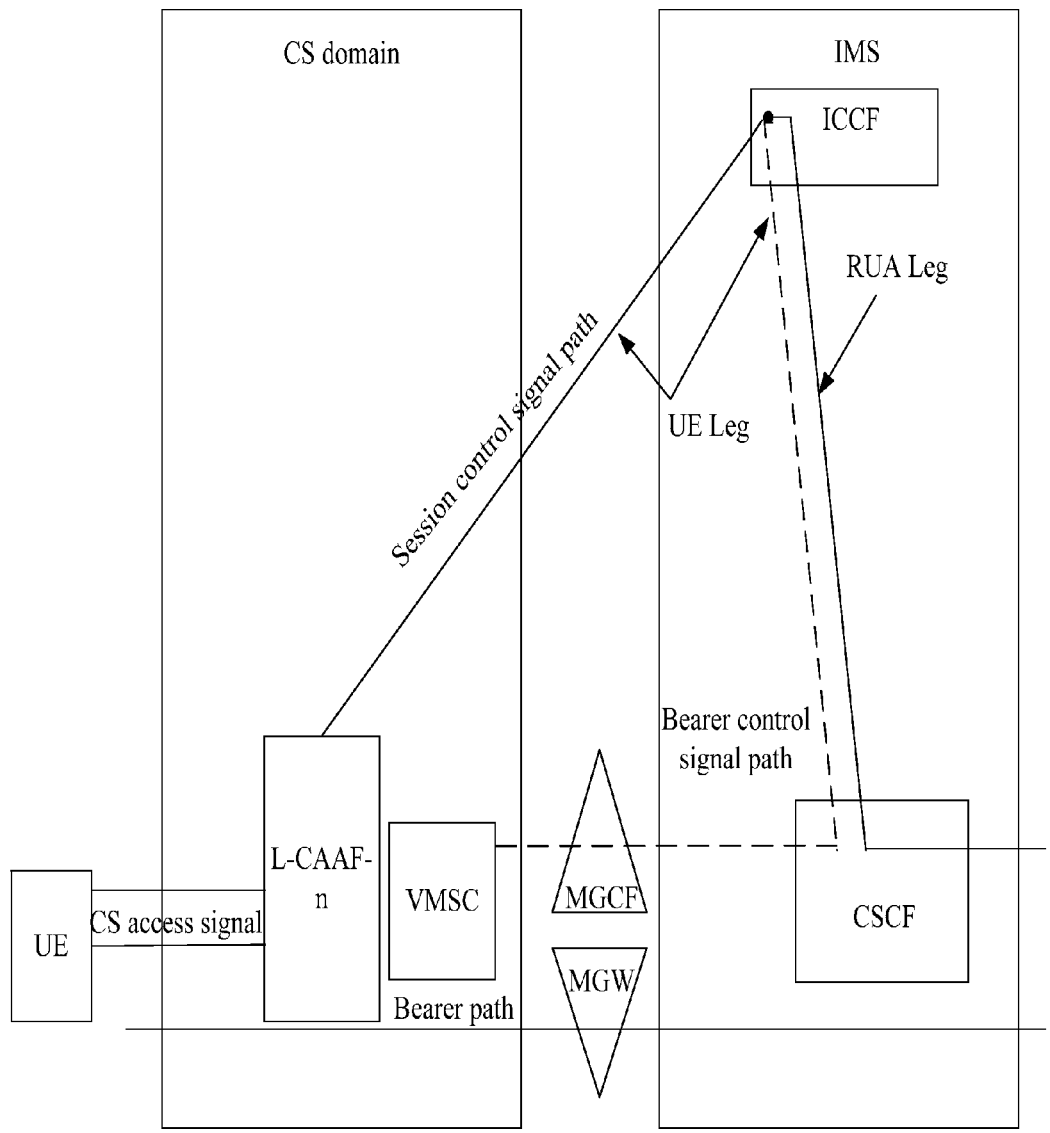
FIG. 1 shows a system structure of an ICS in the prior art.
Figure 2:
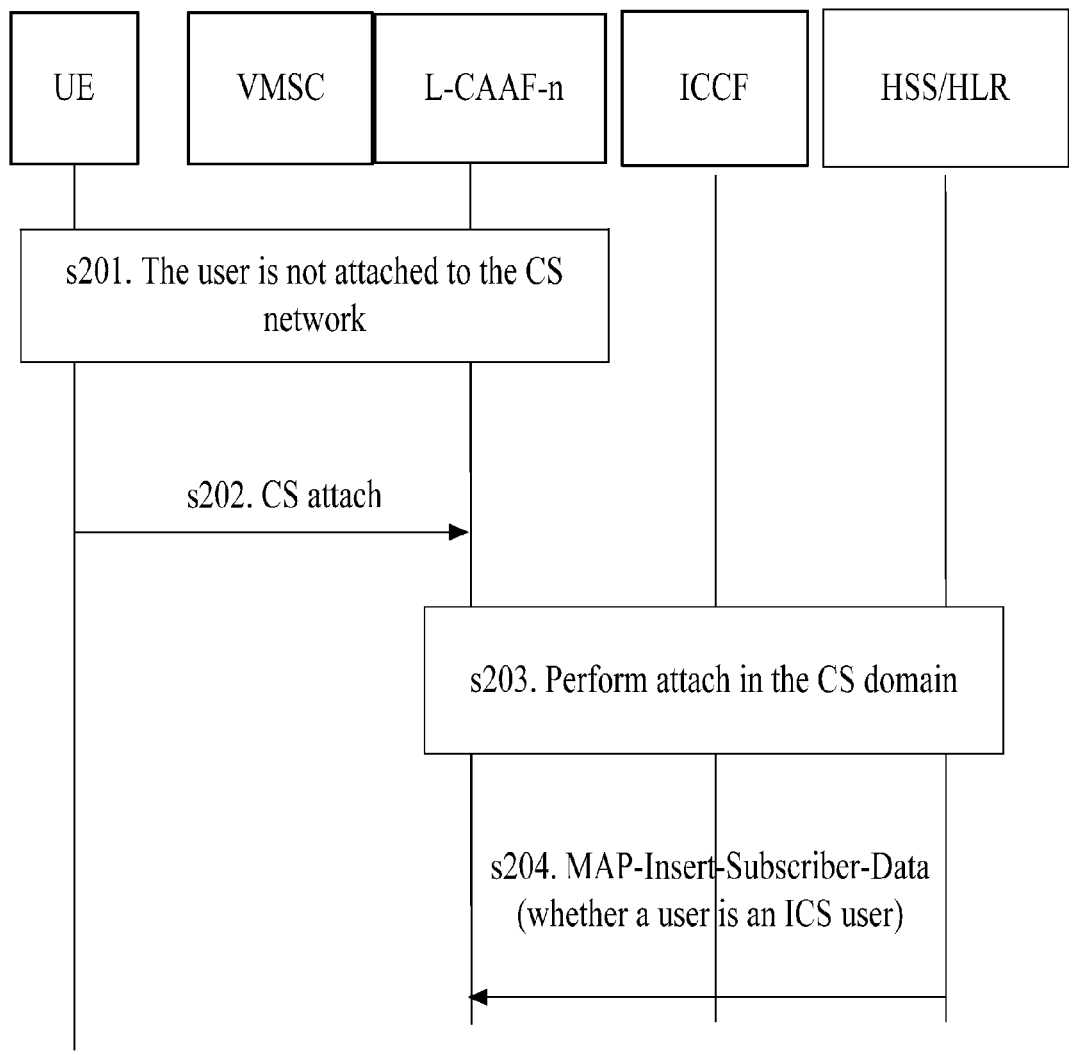
FIG. 2 is a flowchart of a method for an L-CAAF-n to determine whether a user is an ICS user in a first embodiment of the present invention.

The first embodiment of the present invention describes how the L-CAAF-n determines whether a user is an ICS user. As shown in FIG. 2, the specific process includes the following steps:

Steps s201 and s203: The UE performs normal CS attach and location update because the UE fails to be attached to the CS network at the beginning.

Step s204: The HSS sends a MAP-Insert-Subscribe-Data message to the L-CAAF-n, indicating that the user is an ICS user. The methods for identifying that a user is an ICS user in the MAP-Insert-Subscribe-Data message include but are not limited to the following:

Add a value for the SS-Code field or other proper fields in the MAP_Insert-Subscribe-Data message to indicate that the user is an ICS user. In this case, the ICS is processed as a supplementary service. If the L-CAAF-n finds that the user is an ICS user, the L-CAAF-n registers with the IMS for the user. Otherwise, the L-CAAF-n does not register the user with the IMS.

Add a field to the MAP_Insert-Subscribe-Data message to indicate that the user is an ICS user.

In this embodiment, if the L-CAAF-n is deployed independently, the L-CAAF-n needs to query the VLR or HLR to see whether the user is an ICS user. If the L-CAAF-n is integrated with the MSC, the L-CAAF-n may acquire whether the user is an ICS user from the VLR. If an interface is added between the L-CAAF-n and the HSS, the L-CAAF-n may acquire the information of the user through the interface. The L-CAAF-n may simulate existing function entities to acquire the subscription information of the user from the HSS through the Cx or SH interface. In addition, the L-CAAF-n may subscribe to or query the subscription information of the user through the SH or Cx interface. If the access adapting unit receives a SIP message sent from the ICCF, it means that the user has the ICCF and is an ICS user. Thus, the access adapting unit further decides to notify the relevant CS information of the user to the ICCF.

In the following embodiment, suppose that the user is an ICS user. If the user is not an ICS user, the L-CAAF-n only needs to transparently transmit the request message sent from the UE to the MSC for processing.

In the following embodiment, the L-CAAF-n serves as an independent entity. In the specific implementation, the L-CAAF-n may be also integrated with the MSC. In this case, the interface between the L-CAAF-n and the MSC becomes an internal interface.

Figure 3A:
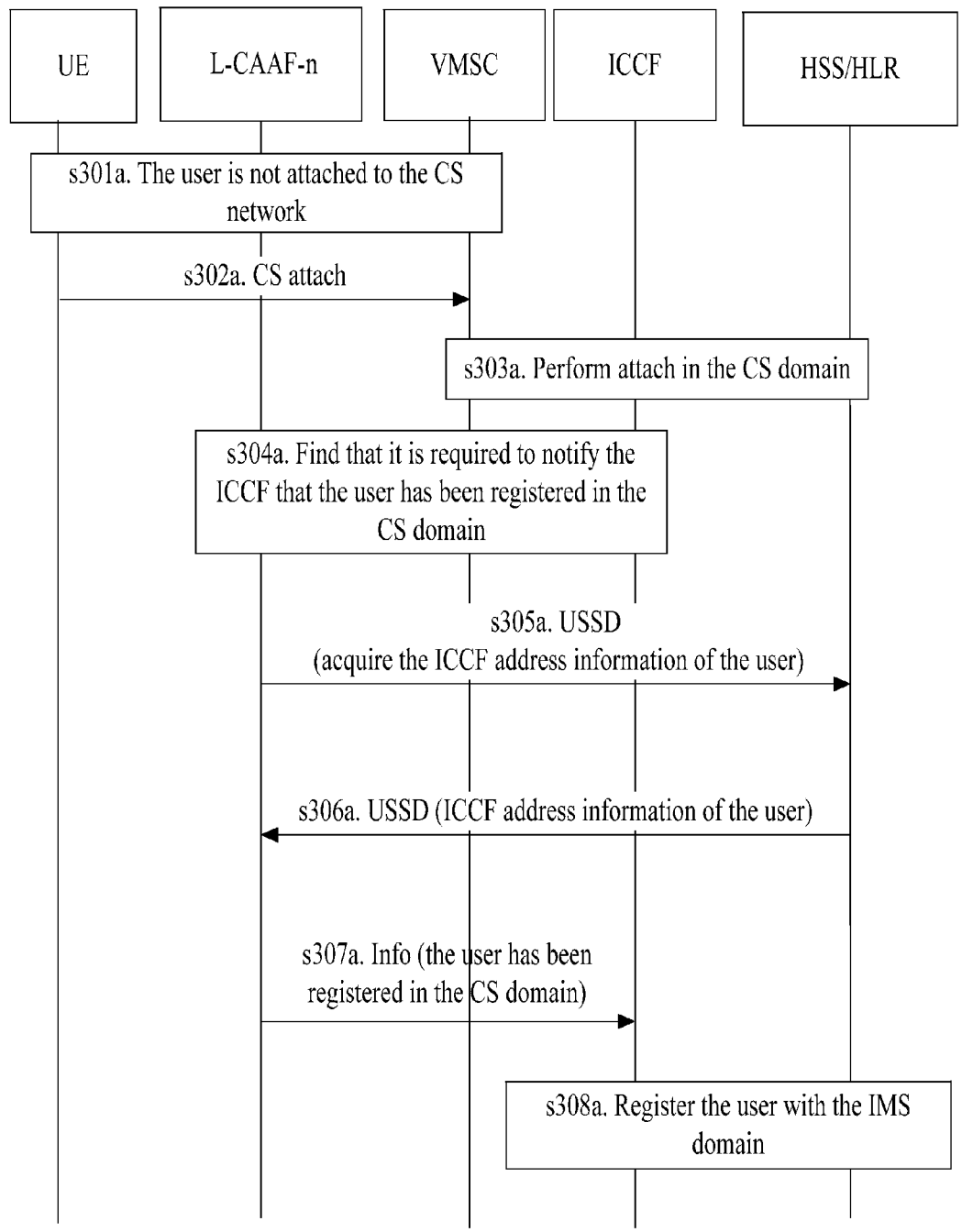
FIG. 3a is a flowchart of a method for using unstructured supplementary service data (USSD) to acquire ICCF address information in a second embodiment of the present invention.

The second embodiment of the present invention describes a method for using USSD to acquire the ICCF address information. As shown in FIG. 3a, the method includes the following steps:

Steps s301a to s303a: The UE performs normal CS location update.

Step s304a: The L-CAAF-n finds that a message should be sent to the ICCF, indicating that the user is attached to the CS network.

Step s305a: The L-CAAF-n sends a USSD message to the HSS/HLR to acquire the ICCF address information of the user.

Step s306a: The HSS returns the ICCF address information to the L-CAAF-n through a USSD message. The ICCF address information returned by the HSS may be configured in the HSS or queried by the HSS from a fixed place such as a database that stores the ICCF address information of all users.

Step s307a: The L-CAAF-n sends an Info message to the ICCF to notify the ICCF that the user has been registered in the CS domain. It should be noted that the L-CAAF-n may also send a Register message and that the Info message may carry the address information of the L-CAAF-n.

Step s308a: The ICCF registers with the IMS domain for the user.

Figure 3B:
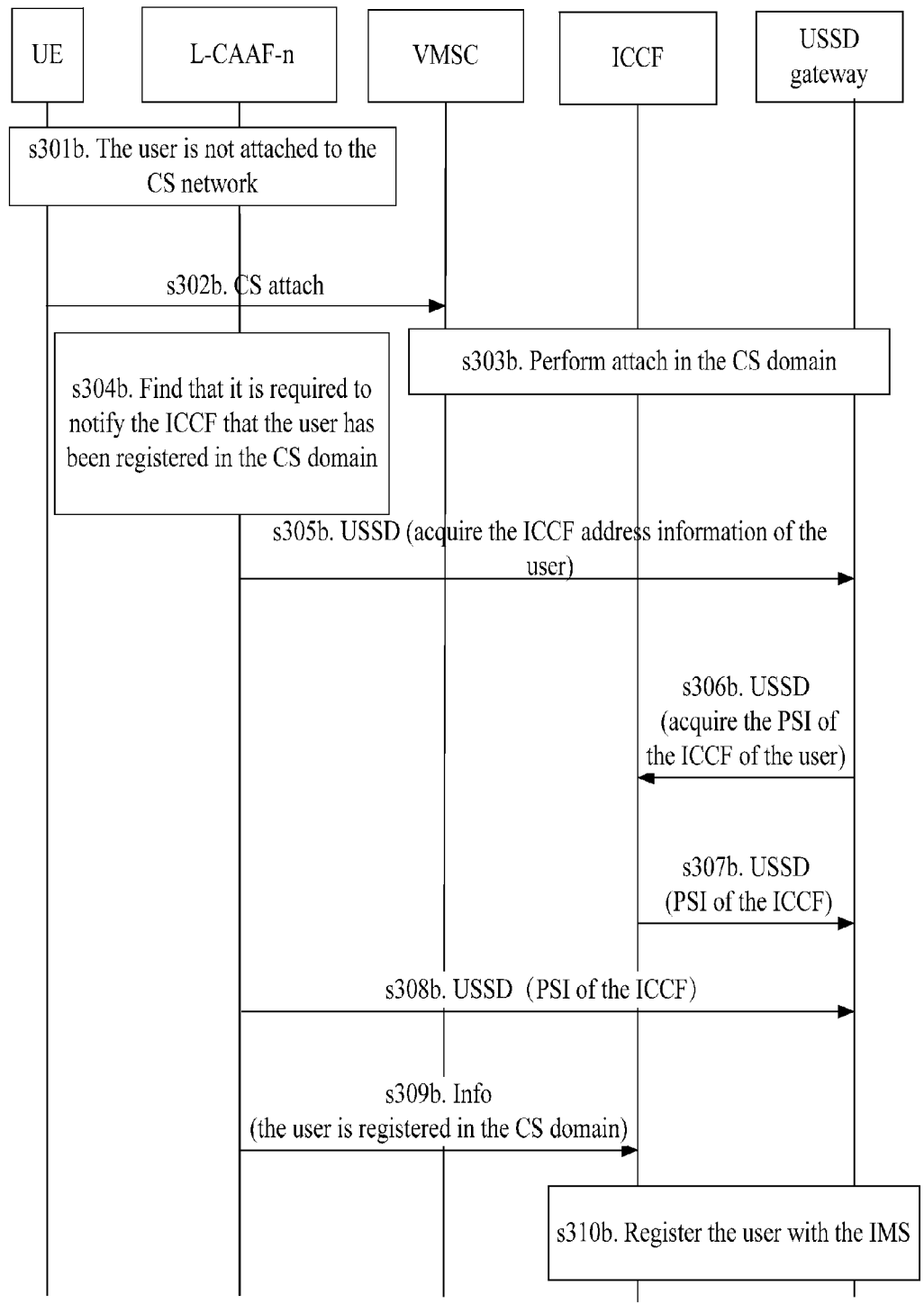
FIG. 3b is a flowchart of another method for acquiring ICCF address information in the second embodiment of the present invention.

In addition to sending a USSD message to the HSS to acquire the public service identity (PSI) address of the ICCF, as described in steps s305a to s307a, the L-CAAF-n may directly send a USSD message to the ICCF to query the PSI address of the ICCF. One of the specific routing methods may be as follows: The USSD message sent from the L-CAAF-n is routed to an entity with the function of delivering the USSD message. The ICCF address information of the user is configured on the entity. Thus, the entity may route the USSD message to the ICCF of the user. As shown in FIG. 3b, the specific implementation process includes the following steps:

Steps s301b to s303b: The UE performs normal CS location update.

Step s304b: The L-CAAF-n finds that a message should be sent to the ICCF, indicating that the user is attached to the CS network.

Step s305b: The L-CAAF-n sends a USSD message to acquire the PSI address of the ICCF. The USSD message is routed to the USSD gateway.

Step s306b: The USSD gateway forwards the USSD message to the ICCF of the user.

Steps s307b and s308b: The ICCF returns its PSI address through a USSD message.

Step s309b: The L-CAAF-n sends an Info message to the ICCF to notify the ICCF that the user has been registered in the CS domain.

Step s310b: The ICCF registers with the IMS domain for the user.

It should be noted that the L-CAAF-n may also send an SMS message or a Diameter message to query the PSI address of the ICCF.

Figure 4:
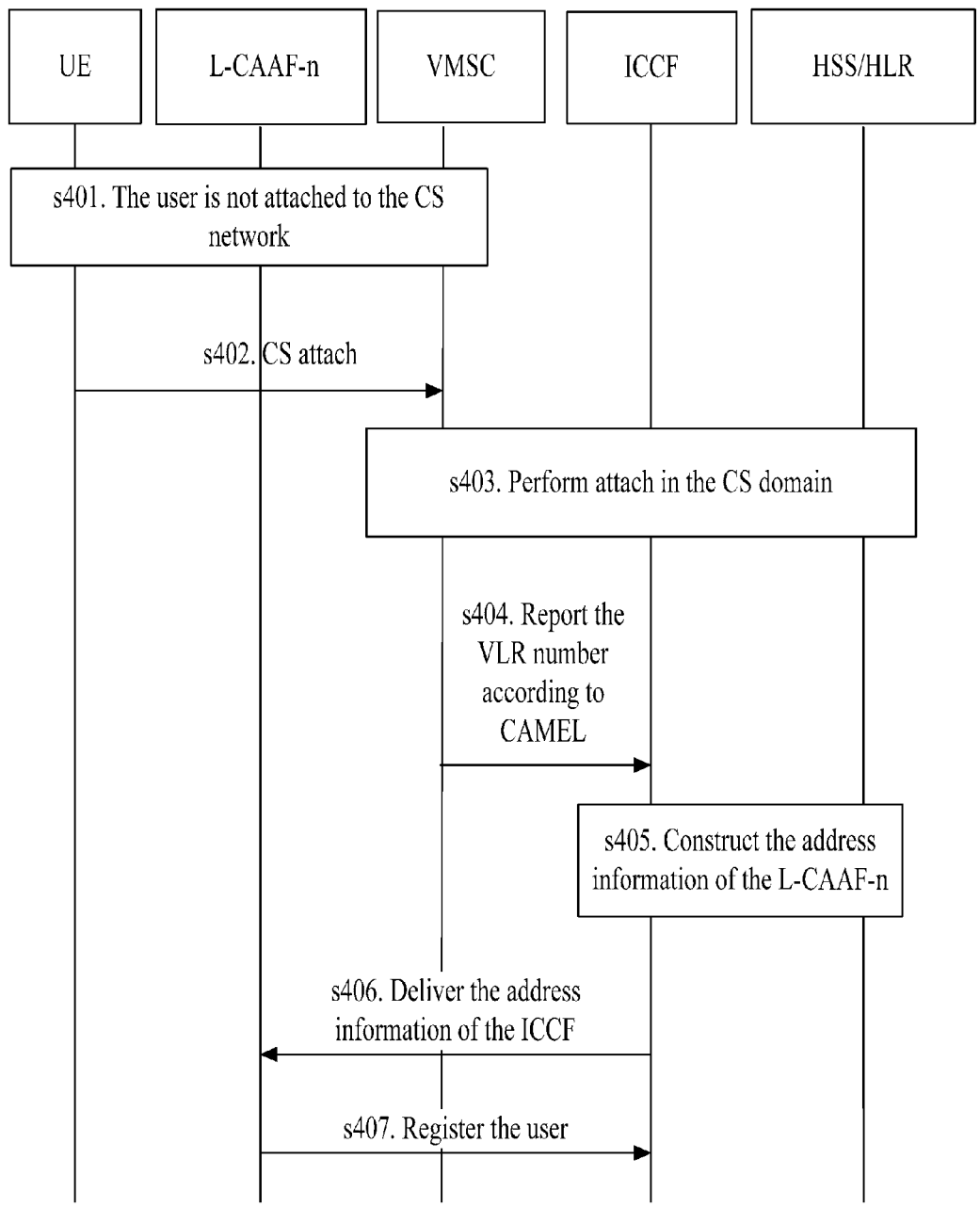
FIG. 4 is a flowchart of a method for using Customized Applications for Mobile Network Enhanced Logic (CAMEL) to report a visitor location register (VLR) number in a third embodiment of the present invention.

In the third embodiment of the present invention, CAMEL may be used to report the VLR number. As shown in FIG. 4, the specific implementation process includes the following steps:

Steps s401 to s403: The UE performs normal CS location update.

Step s404: The visited mobile switching center (VMSC) reports the current VLR number of the user through a MAP-NOTE-MM-EVENT message in CAMEL.

Step s405: The ICCF constructs the address information of the L-CAAF-n according to the reported VLR number. The VLR number including a public land mobile network (PLMN) number is globally unique and the L-CAAF-n corresponds to the VLR on a one-to-one basis. Thus, the ICCF may uniquely address an L-CAAF-n according to the VLR number. The methods for the ICCF to address an L-CAAF-n include but are not limited to the following:

The ICCF constructs a uniform resource identifier (URI) address of the L-CAAF-n according to the VLR number in the following format: "VLR number@"PLMN identifier of the VLR".

The corresponding ICCF address information of the VLR is configured on the ICCF.

Step s406: The ICCF sends its own address information to the L-CAAF-n through a SIP message. In addition to the ICCF address information, the SIP message may carry the information indicating that the user is an ICS user to trigger the L-CAAF-n to send a Register message. The SIP message may be an Info message or other proper messages.

Step s407: After receiving the ICCF address information, the L-CAAF-n sends a Register message to the ICCF to notify the ICCF that the user has been registered in the CS domain. It should be noted that the L-CAAF-n may also send an Info message.

The service control point (SCP) in this embodiment may be independently deployed or be integrated with the ICCF. When the SCP is integrated with the ICCF, the VLR number reported by the UE is transmitted between the SCP and the ICCF through an internal message. If the SCP is deployed independently, the VLR number is transmitted between the SCP and the ICCF through an external interface.

Figure 5:
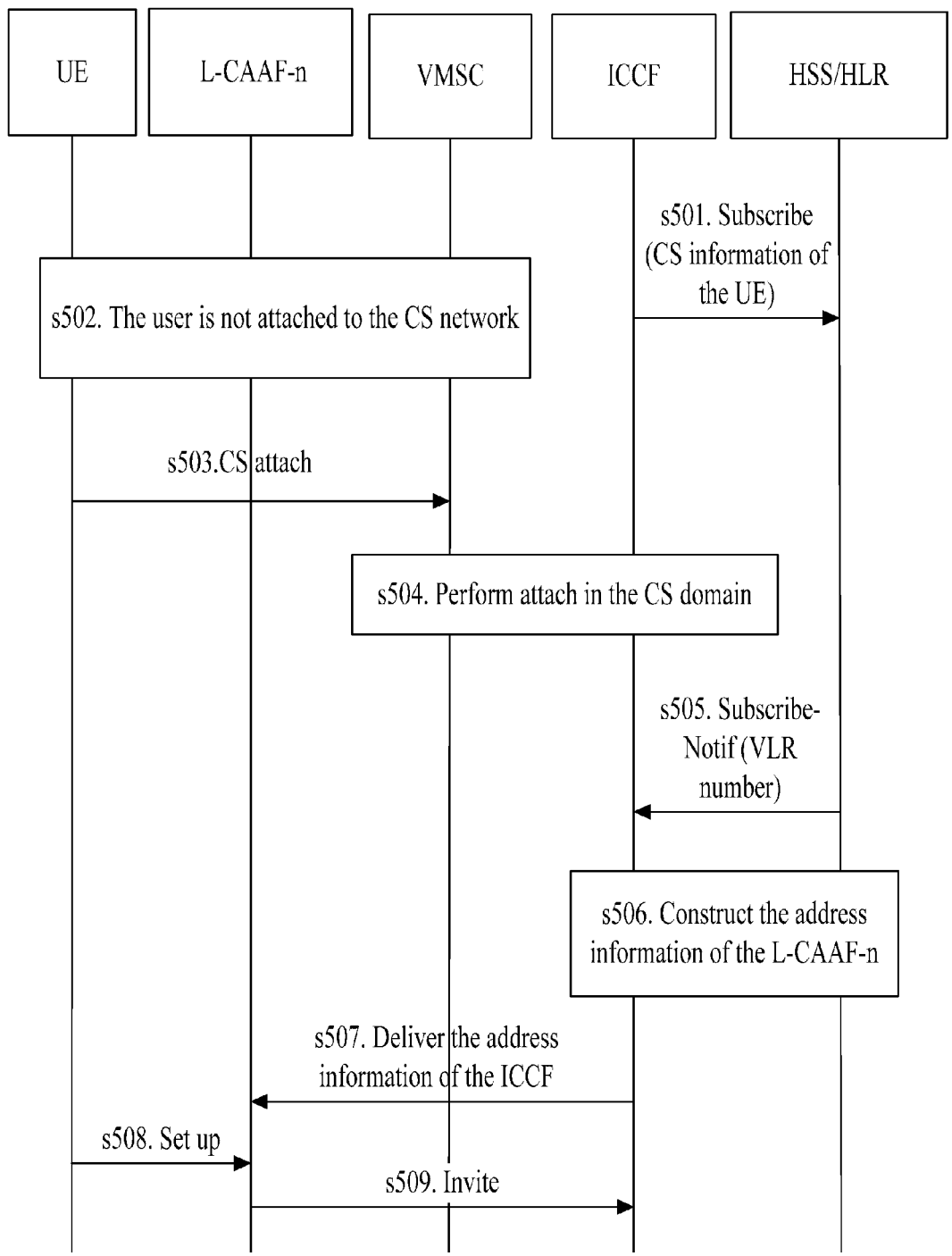
FIG. 5 is a flowchart of a method for an HSS to deliver a VLR number in a fourth embodiment of the present invention.

The fourth embodiment provides a method for the HSS to deliver a VLR number. As shown in FIG. 5, the method includes the following steps:

Step s501: The ICCF sends a Subscribe message to the HSS through the SH interface to subscribe to the VLR number of the user.

Steps s502 to s504: The UE performs normal CS location update.

Step s505: The HSS sends the current VLR number of the user to the ICCF through the SH interface according to the Subscribe message sent from the ICCF.

Step s506: The ICCF constructs the address information of an L-CAAF-n according to the received VLR number. The VLR number including the PLMN number is globally unique and the L-CAAF-n corresponds to the VLR on a one-to-one basis. Thus, the ICCF may uniquely address an L-CAAF-n according to the VLR number. The methods for the ICCF to address an L-CAAF-n include but are not limited to the following:

The ICCF constructs a URI address of the L-CAAF-n according to the VLR number in the following format: "VLR number@"PLMN identifier of the VLR".

The corresponding ICCF address information of the VLR is configured on the ICCF.

Step s507: The ICCF sends its own address to the L-CAAF-n through a SIP message. The SIP message may be an Info message. In addition to the ICCF address information, the SIP message may carry the information indicating that the user is an ICS user.

Step s508: The UE sends a call request message to the L-CAAF-n.

Step s509: The L-CAAF-n sends an Invite message to the ICCF according to the call request message sent from the UE and the ICCF address information acquired in step s507. The L-CAAF-n sends an Invite message only when receiving the ICCF address information and the call request message sent from the UE.

In this embodiment, the ICCF first needs to determine whether the user is an ICS user and then subscribes to the VLR number of the user only when the user is an ICS user.

Figure 6:
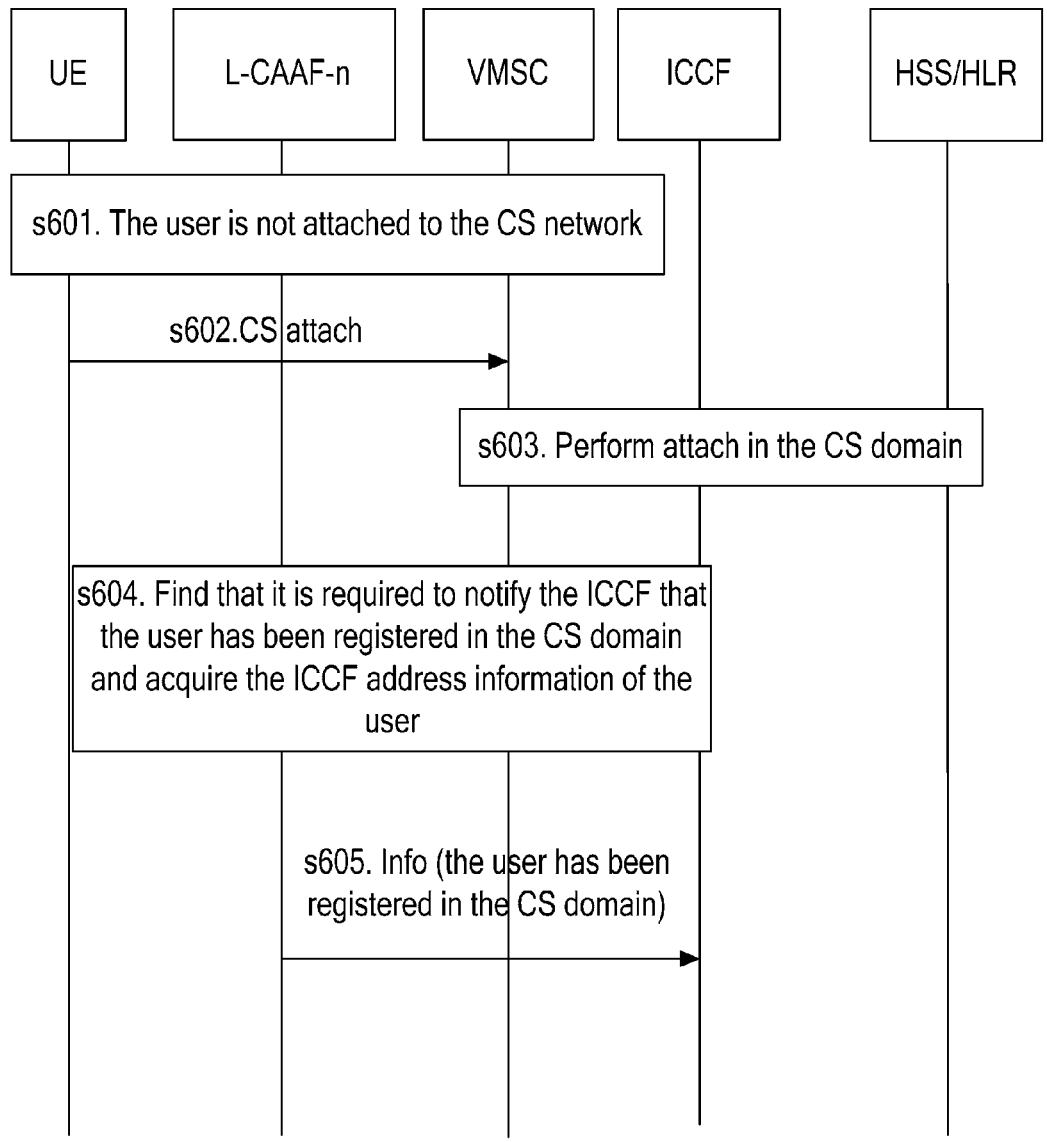
FIG. 6 is a flowchart of a method for constructing ICCF address information in a fifth embodiment of the present invention.

The fifth embodiment provides a method for constructing ICCF address information. As shown in FIG. 6, the method includes the following steps:

Steps s601 to s603: The UE performs normal CS location update.

Step s604: The L-CAAF-n finds that a message should be sent to notify the ICCF that the user has been registered in the CS domain. Thus, the L-CAAF-n constructs the ICCF address information of the user. The methods for the L-CAAF-n to acquire the ICCF address information include but are not limited to the following:

Construct a URI address in the following format: "HLR number of the user+special user number" "PLMN identifier of the home domain".

Directly use the configured ICCF address information of the user on the L-CAAF-n.

Step s605: According to the constructed ICCF address information in step s604, the L-CAAF-n sends a message to notify the ICCF that the user has been registered in the CS domain. The message may be an Info message or a proper SIP message. The message may also carry the address information of the L-CAAF-n.

Steps s604 and s605 just describe the case where the L-CAAF-n perceives that it is required to notify the ICCF that the user has been registered in the CS domain. In fact, the L-CAAF-n may also send a Register message to the ICCF or send an Invite message to the ICCF when the UE initiates a call.

Figure 7:
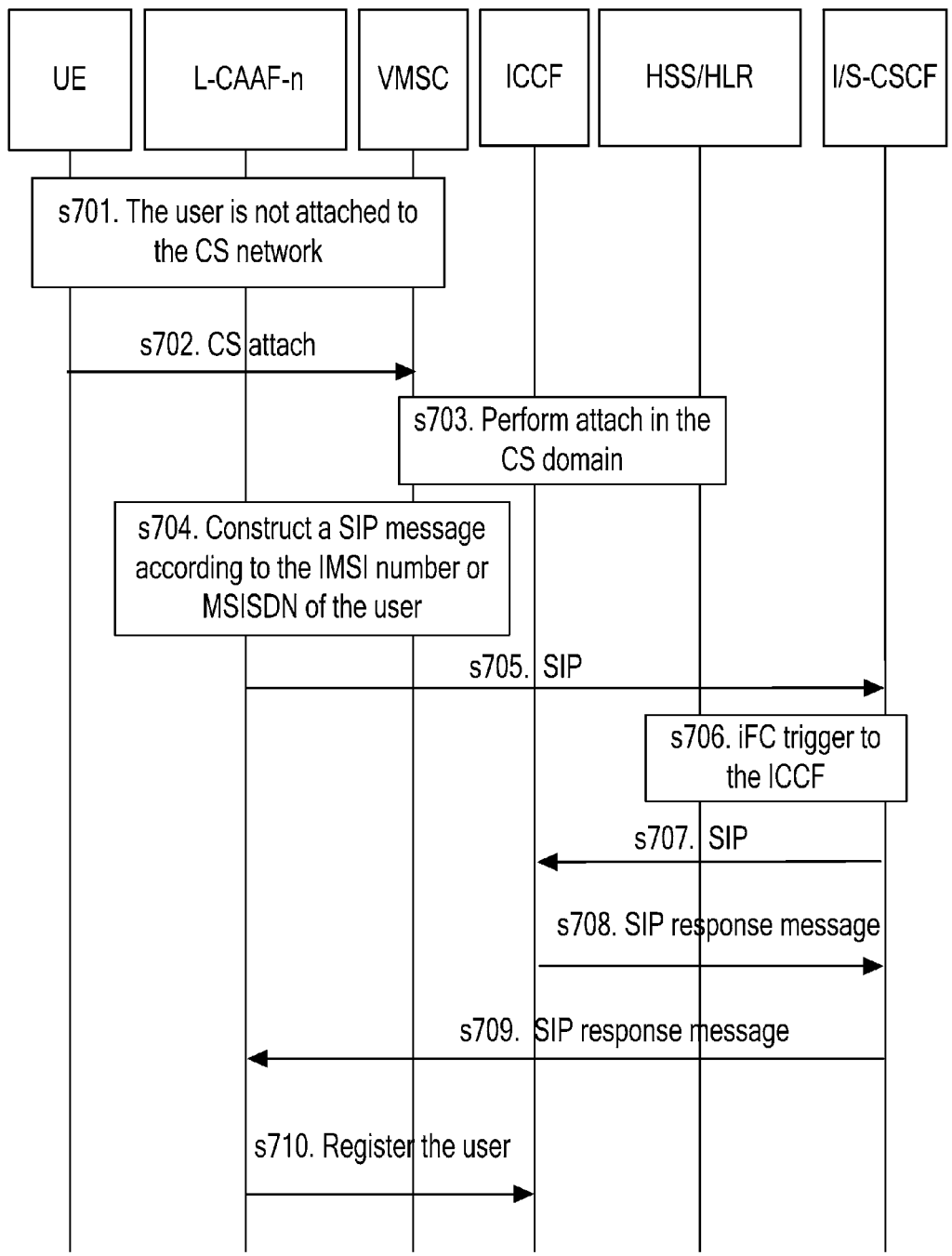
FIG. 7 is a flowchart of an initial filter criteria (iFC) trigger method in a sixth embodiment of the present invention.

The sixth embodiment provides an iFC trigger method. As shown in FIG. 7, the method includes the following steps:

Steps s701 to s703: The UE performs normal CS location update.

Step s704: The L-CAAF-n constructs a SIP message according to the international mobile subscriber identity (IMSI) or mobile station integrated services digital number (MSISDN) of the user. The SIP message may be an Info message.

Step s705: The L-CAAF-n sends the constructed SIP message to the S-CSCF. The SIP message may also carry the address information of the L-CAAF-n.

Step s706: The S-CSCF sends the SIP message to the ICCF through iFC trigger.

Steps s708 and s709: The ICCF returns its own address information through a response message. The ICCF may also return its own address information through a new SIP message.

Step s710: The L-CAAF-n registers with the IMS domain for the user.

A system for establishing association-control relations is also provided. The system includes an access adapting unit and an ICCF. The access adapting unit is adapted to: acquire the address information of the ICCF after determining that a user is an ICS user and notify the CS information of the user to the ICCF. The CS information includes the address information of the access adapting unit. The ICCF is adapted to acquire the address information of the access adapting unit and provide its own address information for the access adapting unit.

Figure 8:
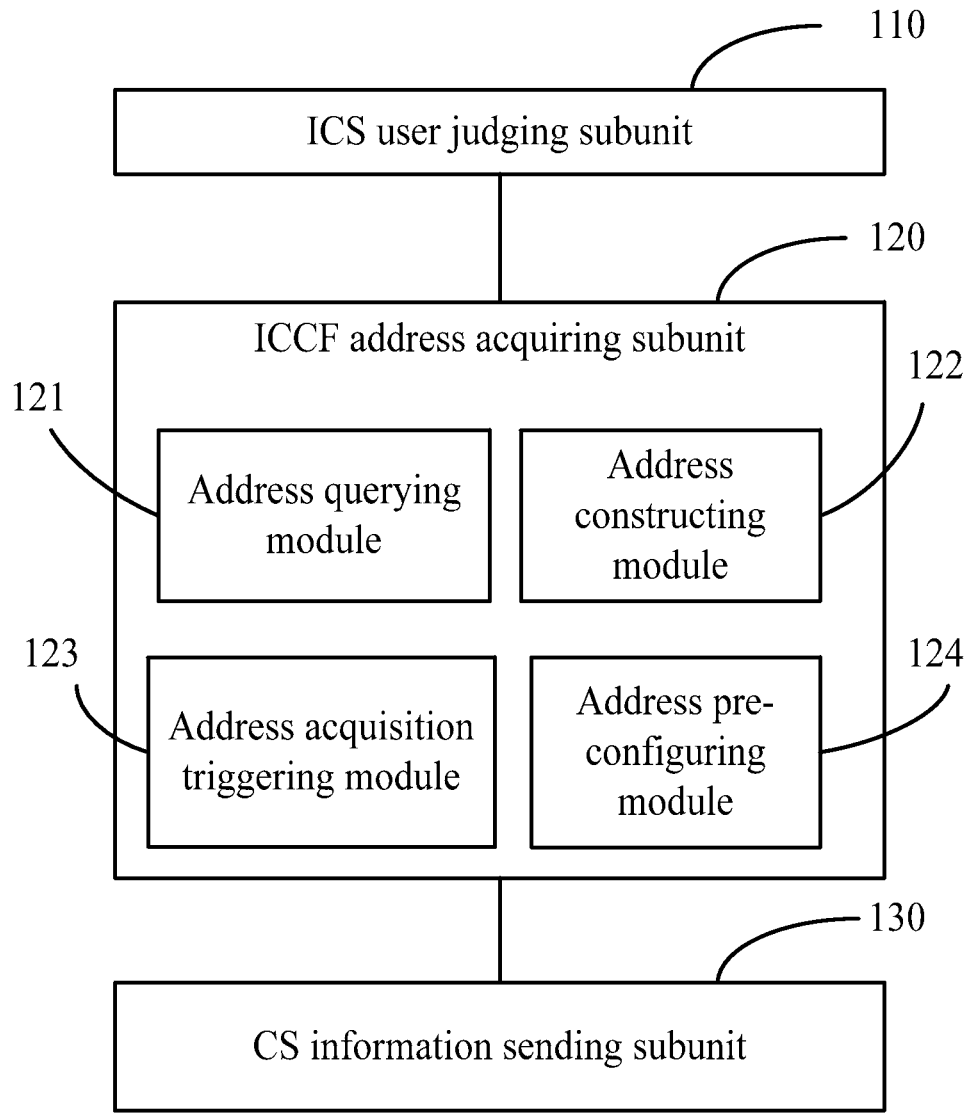
FIG. 8 shows a structure of an access adapting unit in an embodiment of the present invention.

As shown in FIG. 8, the access adapting unit further includes an ICS user judging subunit 110, an ICCF address acquiring subunit 120, and a CS information sending subunit 130. The ICS user judging subunit 110 is adapted to determine whether a user is an ICS user. For example, a first network entity acquires the subscription information of a user from a MAP message, an SH interface message, or a Cx interface message and determines whether the user is an ICS user according to the subscription information. The ICCF address acquiring subunit 120 is in communication with the ICS user judging subunit 110 and is adapted to acquire the address information of the ICCF after determining that the user is an ICS user. For example, the ICCF address acquiring subunit 120 sends a USSD message, an SMS message, or a Diameter message to the HSS to acquire the address information of a second network entity, or directly sends a query message to the second network entity to query the PSI address. The CS information sending subunit 130 is in communication with the ICCF address acquiring subunit 120 and is adapted to notify the CS information of the user to the ICCF.

The ICCF address acquiring subunit 120 further includes an address querying module 121, an address constructing module 122, an address acquisition triggering module 123, and an address pre-configuring module 124.

The address querying module 121 is adapted to send a query message to the HSS to acquire ICCF address information.

The address constructing module 122 is adapted to acquire at least one of the following numbers: IMSI number and MSISDN of the user, and construct the address information of the home ICCF of the user according to the acquired number.

The address acquisition triggering module 123 is adapted to construct a URI of the user according to at least one of the following numbers: IMSI number and corresponding MSISDN of the user. The access adapting unit sends a SIP request message to the S-CSCF in the home domain to enable the S-CSCF to send the message to the ICCF through iFC trigger. Then the ICCF sends its own address information to the access adapting unit.

The address pre-configuring module 124 is adapted to pre-configure the ICCF address information of all users.

Figure 9:
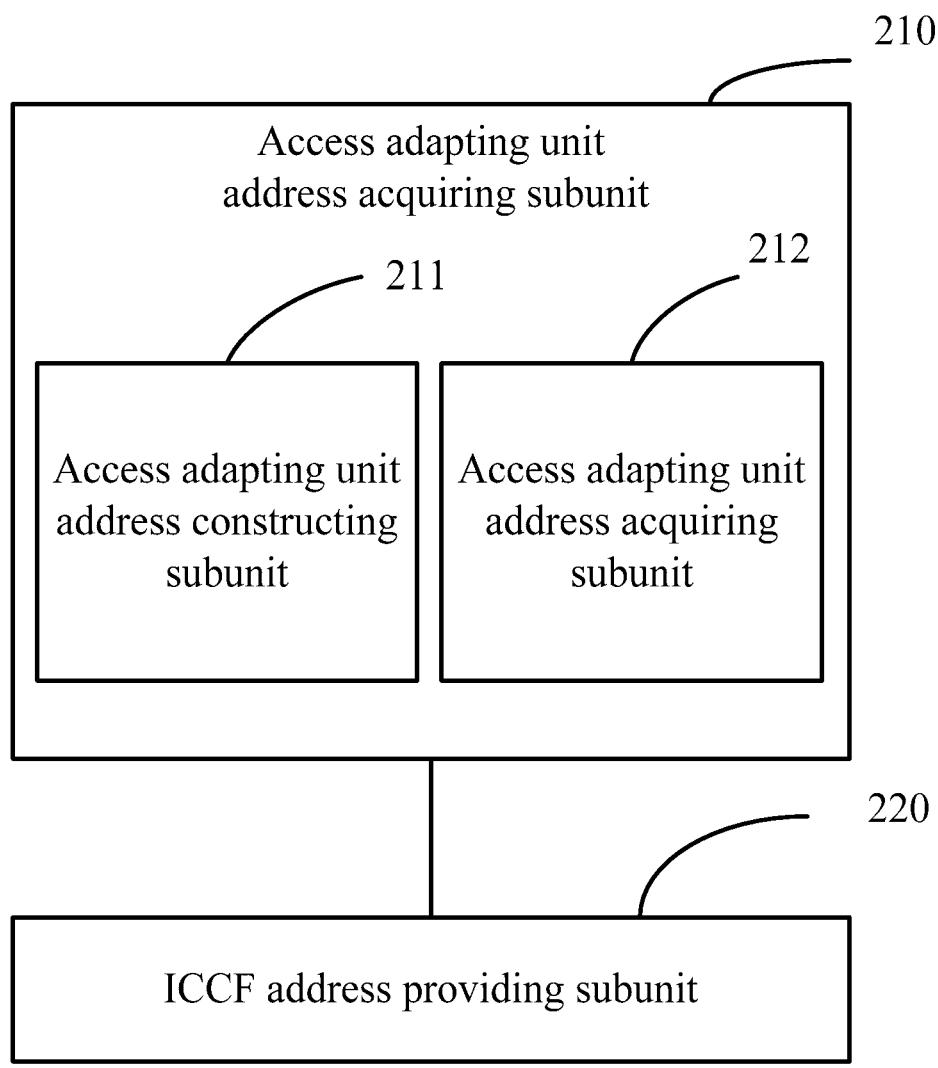
FIG. 9 shows a structure of an ICCF in an embodiment of the present invention.

As shown in FIG. 9, the ICCF further includes an access adapting unit address acquiring subunit 210 and an ICCF address providing subunit 220. The access adapting unit address acquiring subunit 210 is adapted to acquire the address information of the access adapting unit. One method is to construct the address of a first network entity by acquiring the current VLR number of the user. The VLR number may be acquired from the message sent from the VLR or the message sent from the HSS. The ICCF address providing subunit 220 is adapted to provide its own address information for the access adapting unit address acquiring subunit 210.

The access adapting unit address acquiring subunit 210 further includes an access adapting unit address constructing unit 211 and an access adapting unit address acquiring module 212. The access adapting unit address constructing unit 211 is adapted to construct the address of the access adapting unit by acquiring the current VLR number of the user. The access adapting unit address acquiring module 212 is adapted to acquire the address directly from the message sent from the access adapting unit.

With the embodiments of the present invention, the L-CAAF-n may know whether a user is an ICS user according to the subscription information of the user. When the user is an ICS user, the L-CAAF-n may acquire ICCF address information and sends its own address information to the ICCF, or the ICCF first acquires the address information of the L-CAAF-n and then delivers its own address information to the L-CAAF-n. In this way, the L-CAAF-n and the ICCF may know the address information of each other so that association-control relations may be established between the L-CAAF-n and the ICCF.

Through the preceding descriptions of the embodiments of the present invention, it is understandable to those skilled in the art that the embodiments of the present invention may be implemented by hardware or by software in combination with a necessary hardware platform. Thus, the technical solution of the present invention may be embodied as a software product. The software may be stored in a non-volatile storage medium such as a compact disc-read only memory (CD-ROM), a USB disk, or a mobile hard disk, and includes several instructions that instruct a computer device such as a personal computer, a server, or a network device to perform the method provided in each embodiment of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for determining whether a user is an IP Multimedia Subsystem (IMS) centralized service (ICS) user, comprising:
   acquiring, by an access adapting unit, subscription information of the user through a mobile application part (MAP) message;
   acquiring information indicating that the user is an ICS user from the subscription information of the user; and
   wherein a field is added to the MAP_Insert-Subscribe-Data message to identify that the user is an ICS user when the access adapting unit acquires the subscription information of the user through the MAP message.

2. The method of claim 1, further comprising:
   acquiring, by the access adapting unit, address information of an IMS CS control function (ICCF); and
   sending, by the access adapting unit, its own address information to the ICCF.

3. The method of claim 2, wherein the process of acquiring the address information of the ICCF comprises any one of the following:
   sending, by the access adapting unit, a query message to a home subscriber server (HSS) to acquire the address information of the ICCF; and
   sending, by the access adapting unit, the query message to the ICCF to query a public service identity (PSI) address of the ICCF.

4. The method of claim 2, wherein the process of acquiring the address information of the ICCF comprises:
   acquiring, by the access adapting unit, an international mobile subscriber identity (IMSI) number or a corresponding mobile station integrated services digital number (MSISDN) of the user; and
   constructing the address information of the home ICCF of the user according to the acquired number.

5. The method of claim 2, wherein the process of acquiring the address information of the ICCF comprises:
   pre-configuring, by the access adapting unit, the address information of the ICCF of each user.

6. The method of claim 1, wherein the access adapting unit is integrated with a mobile switching center (MSC).

7. A system for establishing association-control relations, comprising:
   an access adapting unit, adapted to acquire address information of an IMS CS control function (ICCF) after determining that this is an IMS centralized service (ICS) user and notify circuit switched (CS) information of the user to the ICCF, wherein the CS information includes address information of the access adapting unit;
   the ICCF, adapted to acquire the address information of the access adapting unit and provide its own address information for the access adapting unit;
   wherein the access adapting unit comprises: an ICS user judging subunit, adapted to determine whether the user is an ICS user; and
   the ICS user judging subunit specifically adapted to acquire subscription information of the user through a mobile application part (MAP) message, and a field is added to the MAP_Insert-Subscribe-Data message to identify that the user is an ICS user when the access adapting unit acquires the subscription information of the user through the MAP message.

8. The system of claim 7, wherein the access adapting unit further comprises:
   an ICCF address acquiring subunit, in communication with the ICS user judging subunit and adapted to acquire the address information of the ICCF after determining that the user is an ICS user; and
   a CS information sending subunit, in communication with the ICCF address acquiring subunit and adapted to notify the CS information of the user to the ICCF.

9. The system of claim 8, wherein the ICCF comprises:
   an access adapting unit address acquiring subunit, adapted to acquire the address information of the access adapting unit; and
   an ICCF address providing subunit, adapted to provide its own address information for the access adapting unit acquiring subunit.

10. An access adapting unit, comprising:
    an IMS centralized service (ICS) user judging subunit, adapted to determine whether a user is an ICS user;
    an IMS CS control function (ICCF) address acquiring subunit, in communication with the ICS user judging subunit and adapted to acquire address information of the ICCF;
    a circuit switched (CS) information sending subunit, in communication with the ICCF address acquiring subunit and adapted to notify CS information of the user to the ICCF; and
    wherein the ICS user judging subunit specifically adapted to acquire subscription information of the user through a mobile application part (MAP) message, and a field is added to the MAP_Insert-Subscribe-Data message to identify that the user is an ICS user when the access adapting unit acquires the subscription information of the user through the MAP message.

11. The access adapting unit of claim 10, wherein the ICCF address acquiring subunit comprises one of the following:
    an address querying module, adapted to send a query message to a home subscriber server (HSS) to acquire the ICCF address information of the user;
    an address constructing module, adapted to acquire at least one of the following numbers: an international mobile subscriber identity (IMSI) number and a corresponding mobile station integrated services digital number (MSISDN) of the user and construct the address information of the home ICCF of the user according to the acquired number;
    an address acquisition triggering module, adapted to construct a uniform resource identifier (URI) of the user according to at least one of the following numbers: an international mobile subscriber identity (IMSI) number and a corresponding mobile station integrated services digital number (MSISDN) of the user; and
    an address pre-configuring module, adapted to pre-configure the ICCF address information of each user.

12. An IMS CS control function (ICCF), comprising:
an access adapting unit address acquiring subunit, adapted to acquire address information of an access adapting unit;
an ICCF address providing subunit, adapted to provide its own address information to the access adapting unit address acquiring subunit; and
wherein the access adapting unit address acquiring subunit comprises:
an access adapting unit address constructing module, adapted to construct the address information of the access adapting unit by acquiring a current visitor location register (VLR) number of the user.

* * * * *